(12) United States Patent
Cayford et al.

(10) Patent No.: US 11,356,028 B2
(45) Date of Patent: Jun. 7, 2022

(54) METHODS AND APPARATUS FOR CONTROLLING A POWER CONVERTER

(71) Applicant: Enphase Energy, Inc., Petaluma, CA (US)

(72) Inventors: Damon Charles Cayford, Canterbury (NZ); James Ormrod, Christchurch (NZ)

(73) Assignee: Enphase Energy, Inc., Petaluma, CA (US)

( * ) Notice: Subject to any disclaimer, the term of this patent is extended or adjusted under 35 U.S.C. 154(b) by 27 days.

(21) Appl. No.: 17/164,320

(22) Filed: Feb. 1, 2021

(65) Prior Publication Data

US 2021/0242788 A1    Aug. 5, 2021

Related U.S. Application Data

(60) Provisional application No. 62/968,493, filed on Jan. 31, 2020.

(51) Int. Cl.
| | |
|---|---|
| *H02M 3/335* | (2006.01) |
| *H02M 1/40* | (2007.01) |
| *H02M 3/00* | (2006.01) |

(52) U.S. Cl.
CPC ......... *H02M 3/33576* (2013.01); *H02M 1/40* (2013.01); *H02M 3/01* (2021.05); *H02M 3/33573* (2021.05)

(58) Field of Classification Search
CPC ............. H02M 3/335; H02M 3/33507; H02M 3/33573; H02M 3/33576; H02M 3/01; H02M 1/40

See application file for complete search history.

(56) References Cited

U.S. PATENT DOCUMENTS

| | | | | |
|---|---|---|---|---|
| 4,559,590 | A | * | 12/1985 | Davidson .......... H02M 3/33569 363/133 |
| 5,539,630 | A | | 7/1996 | Brkovic et al. |
| 5,870,291 | A | * | 2/1999 | Farrington ........ H02M 3/33569 363/140 |
| 6,970,366 | B2 | | 11/2005 | Apeland et al. |
| 7,778,046 | B1 | * | 8/2010 | Cuk ...................... H02M 3/157 363/16 |
| 8,363,427 | B2 | | 1/2013 | Anguelov et al. |
| 9,042,122 | B2 | | 5/2015 | Suo et al. |
| 9,042,125 | B1 | | 5/2015 | Wambsganss |
| (Continued) | | | | |

FOREIGN PATENT DOCUMENTS

KR    10-2017-0027714 A    3/2017

OTHER PUBLICATIONS

International Search Report and Written Opinion dated May 26, 2021 for International Application No. PCT/US2021/015993.

*Primary Examiner* — Gary L Laxton
(74) *Attorney, Agent, or Firm* — Moser Taboada

(57) ABSTRACT

Methods and apparatus for controlling a power converter are provided herein. For example, apparatus can include a series resonant circuit including transformer with a primary side winding directly coupled to a DC bridge drive and a control system connected to the series resonant circuit and configured to measure a voltage at the primary side winding for determining a bias signal that can be applied to a resonant capacitor voltage at a secondary side winding of the transformer for restoring a DC content of the DC bridge drive to about zero.

20 Claims, 7 Drawing Sheets

(56) References Cited

U.S. PATENT DOCUMENTS

| | | |
|---|---|---|
| 9,287,795 B2 | 3/2016 | Lu et al. |
| 2005/0036341 A1 | 2/2005 | Guo et al. |
| 2007/0070655 A1* | 3/2007 | Eguchi ............... H02M 3/33592 363/17 |
| 2011/0261590 A1 | 10/2011 | Liu |
| 2014/0254203 A1 | 9/2014 | Dai et al. |
| 2015/0349648 A1 | 12/2015 | Desrosiers et al. |
| 2016/0191053 A1 | 6/2016 | Esmaeili |
| 2017/0279367 A1* | 9/2017 | Qiu ........................ G05B 11/42 |

* cited by examiner

METHODS AND APPARATUS FOR CONTROLLING A POWER CONVERTER

CROSS-REFERENCE TO RELATED APPLICATION

The present application claims priority to and the benefit of U.S. Provisional Patent Application Ser. No. 62/968,493 which was filed on Jan. 31, 2020, the entire contents of which is incorporated herein by reference.

BACKGROUND

Field of the Disclosure

Embodiments of the present disclosure generally relate to methods and apparatus for power converter control, and more particularly, to methods and apparatus for controlling a power converter using primary winding flux bias.

Description of the Related Art

Conventional series resonant circuit (SRC) power converters employ one or more DC blocking capacitors on a primary winding connection of a power transformer to eliminate saturation of the transformer core, e.g., due to the presence of DC in the winding drive voltage. The DC blocking capacitance value is, typically, much larger than the resonant capacitor value of the SRC, e.g., so as not to contribute (interfere) in the SRC and to allow the use of a relatively small secondary side resonant capacitor, or if the DC blocking capacitor is used as the resonant capacitor, the capacitance value of the DC blocking capacitor is also required to be relatively high (e.g., >100 µF).

While DC blocking capacitors are suitable for their intended use, such capacitors present cost, size and/or performance challenges for SRC power converters. Additionally, using relatively large DC blocking capacitor values in a surface mount device (SMD) package can translate into a series/parallel combination of available sizes, and if the DC blocking capacitor is used as the resonant component, then the DC blocking capacitor needs to include a stable dielectric, which can also contribute to increases in both cost and size of the DC blocking capacitor.

In view of the foregoing, the inventors provide herein methods and apparatus for controlling a power converter (e.g., SRC power converter) using primary winding flux bias, thus eliminating the need for a DC blocking capacitor.

SUMMARY

In accordance with at least some embodiments, there is provided an apparatus for controlling a power converter. The apparatus includes a series resonant circuit including transformer with a primary side winding directly coupled to a DC bridge drive and a control system connected to the series resonant circuit and configured to measure a voltage at the primary side winding for determining a bias signal that can be applied to a resonant capacitor voltage at a secondary side winding of the transformer for restoring a DC content of the DC bridge drive to about zero.

In accordance with at least some embodiments, there is provided a method for controlling a power converter. The method includes measuring a voltage at a primary side winding at an input of a series resonant circuit directly coupled to a DC bridge drive and determining a bias signal that can be applied to a resonant capacitor voltage at a secondary side winding at an output of the series resonant circuit for restoring a DC content of the DC bridge drive to about zero.

In accordance with at least some embodiments, there is provided a non-transitory computer readable storage medium having stored therein instructions that when executed by a processor perform a method for controlling a power converter. The method includes measuring a voltage at a primary side winding at an input of a series resonant circuit directly coupled to a DC bridge drive and determining a bias signal that can be applied to a resonant capacitor voltage at a secondary side winding at an output of the series resonant circuit for restoring a DC content of the DC bridge drive to about zero.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only a typical embodiment of this disclosure and are therefore not to be considered limiting of its scope, for the disclosure may admit to other equally effective embodiments.

DETAILED DESCRIPTION

In accordance with the present disclosure, methods and apparatus for controlling a power converter using primary winding flux bias are described herein. More particularly, a primary winding of a power transformer of an SRC circuit is directly connected to a DC bridge drive voltage, and a DC blocking capacitor from an SRC circuit is replaced with a control action managing a flux bias, which mimics the action of the DC blocking capacitor. The SRC circuit provides improved performance in terms of size (e.g., relating to board space) and cost when compared to conventional SRC circuits that use a physical DC blocking capacitor.

In accordance with the present disclosure, by observing a primary winding drive voltage of the power transformer, DC content can be determined/interpreted, and an opposing restorative bias can be applied to an observed resonant capacitor voltage (m signal) to restore DC content of the DC bridge drive voltage to zero, e.g., without affecting total harmonic distortion (THD) of the SRC power converter on the AC port. Additionally, by directly connecting the primary winding to the DC bridge, DC content is not present on the primary winding, and a core of the power transformer is not driven into saturation, which can cause damage to the DC bridge drive, e.g., due to overcurrent.

In at least some embodiments, a control system (e.g., trajectory controller) connected to an SRC power converter is configured to apply the signal to the DC bridge drive to control an amount of DC content in the DC bridge drive (e.g., maintain a 50% duty cycle so as not to drive the core of the power transformer into saturation). The control system is also configured to apply a restorative opposing bias to a controlled m signal (e.g., resonant capacitor voltage) within a trajectory control unit to adjust DC bridge drive timing such that the DC content is removed from the DC bridge drive voltage for the SRC, while retaining a desired charge transfer to the AC port for maintaining a current THD.

Additionally, as DC bridge drive control radii calculated by the control system are not assumed to be symmetrical about an m axis (e.g., controlled independently of each other), the methods and apparatus described herein are capable of operating in three operating modes (e.g., buck, boost, and exchange) of the control system, which can be configured for both single/split phase operation and three-phase operation.

Figure 1:
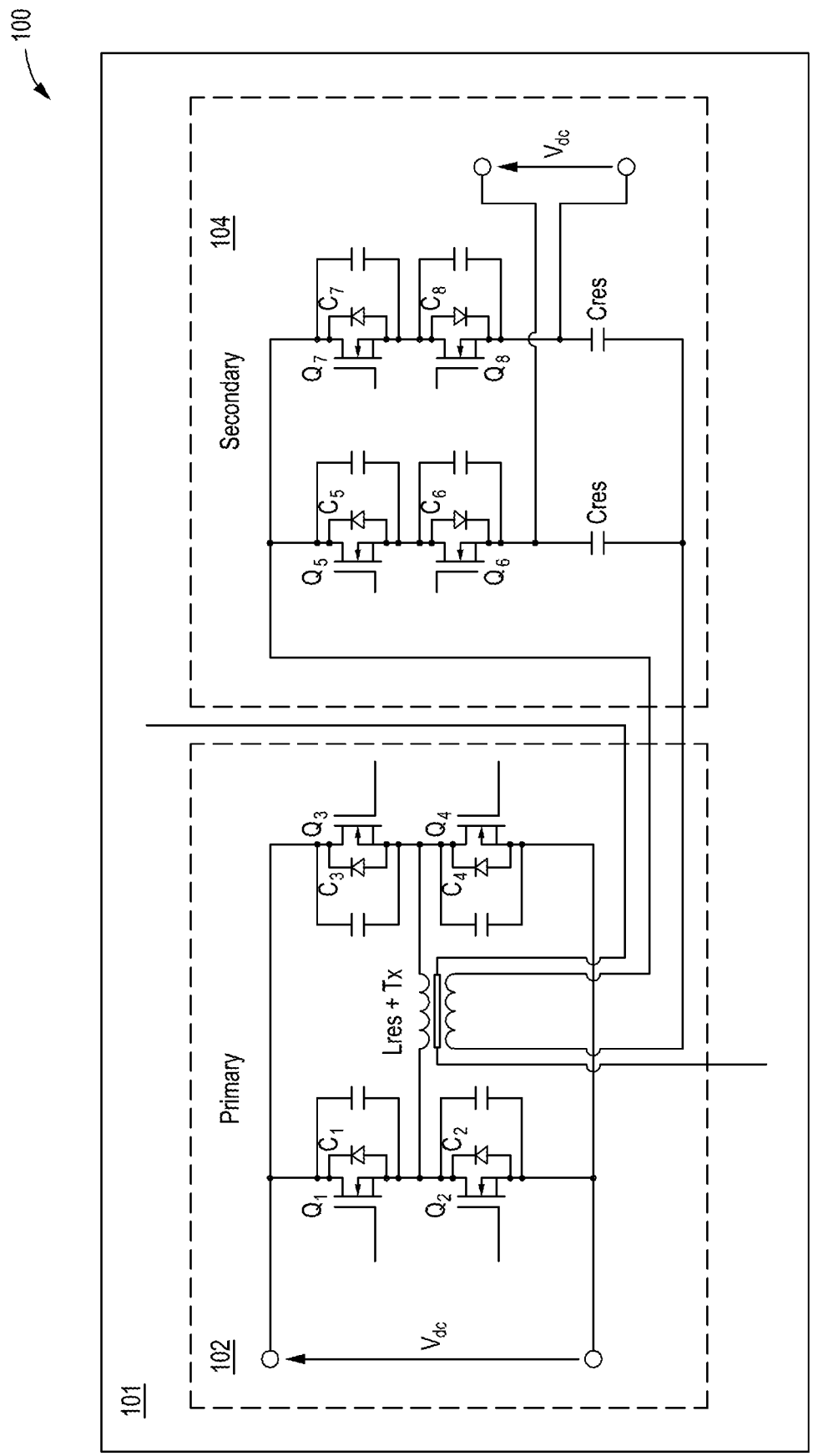
FIG. 1 is a schematic diagram of an SRC circuit of an SRC power converter, in accordance with at least some embodiments of the present disclosure.

FIG. 1 is a schematic diagram of an SRC circuit 100 of an SRC power converter, in accordance with at least some embodiments of the present disclosure. The SRC circuit 100 includes a main power transformer 101 including a primary side winding 102, which connects to a DC bridge drive, and a secondary side winding 104, which connects to an HF cyclo-converter. Each of the primary side winding 102 and secondary side winding 104 includes one or more transistors coupled to corresponding capacitors.

For example, in at least some embodiments, the primary side winding 102 includes a first leg including transistors Q1-Q4 each including corresponding capacitors C1-C4 that are connected across the transistors Q1-Q4. Transistors Q1, Q2 including capacitors C1, C2 are connected in series with each other and in parallel with transistors Q3, Q4 including capacitors C3, C4, which are also connected in series with each other on a second leg of the primary side winding 102. Corresponding diodes are connected across each of the transistors Q1-Q4. An integrated magnet is designated $L_{res}$+Tx and provided on the primary side winding 102 between the first leg and second leg, as shown in FIG. 1. The transistors Q1-Q4 including corresponding capacitors C1-C4 and transistors Q3, Q4 including capacitors C3, C4 are configured to function as AC switches for selecting a corresponding line voltage, as described in greater detail below. The transistors Q1-Q4 including corresponding capacitors C1-C4 and transistors Q3, Q4 including capacitors C3, C4 are part of the restorative opposing bias control that takes the place of a conventional DC blocking capacitor. That is, the main power transformer 101 allows the SRC circuit to operate without a conventional DC blocking capacitor, as will be described in greater detail below.

Similarly, the secondary side winding 104 includes a first leg including transistors Q5-Q8 each including corresponding capacitors C5-C8 that are connected across the transistors Q5-Q8. Transistors Q5, Q6 including capacitors C5, C6 are connected in series with each other and in parallel with transistors Q7, Q8 including capacitors C7, C8, which are also connected in series with each other on a second leg of the secondary side winding 104. Corresponding diodes are connected across each of the transistors Q5-Q8. Additionally, a pair of resonant capacitors Cres are connected on each of the first leg and second leg of the secondary side windings and to an output Vac.

Figure 2:
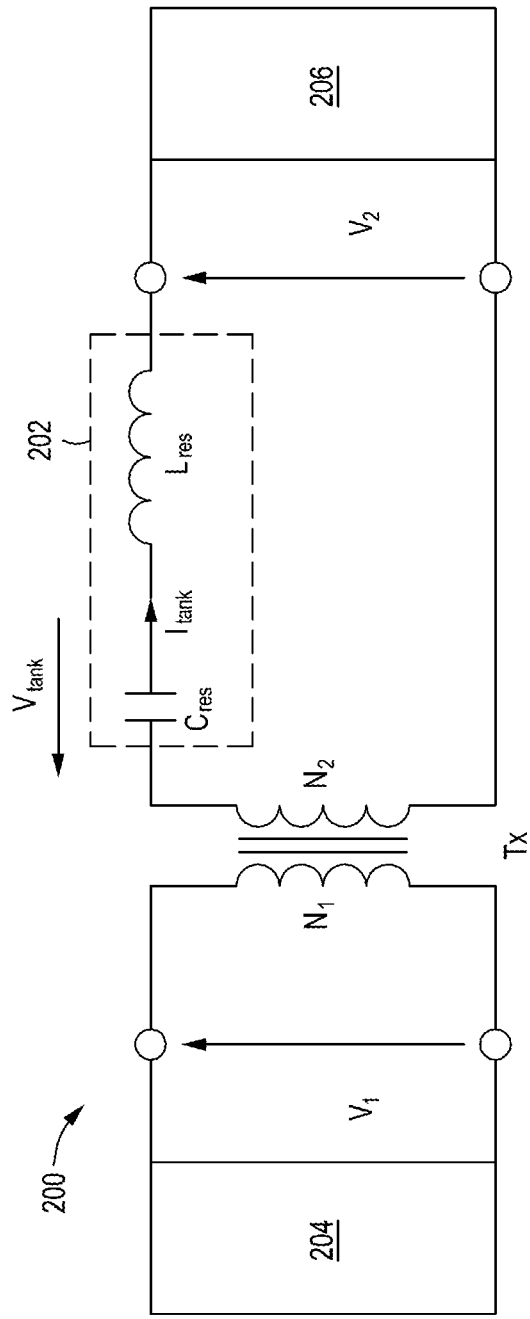
FIG. 2 is a schematic diagram of an SRC equivalent circuit, in accordance with at least some embodiments of the present disclosure.

FIG. 2 is a schematic diagram of an SRC equivalent circuit 200, in accordance with at least some embodiments of the present disclosure. As described above, the present disclosure relates to a management of a flux bias on the primary side winding 102 of the main power transformer 101. Particularly, a quasi-sine wave current is used for transfer of electrical power through the SRC circuit 100 of an LC network 202 (e.g., resonant network). More particularly, the LC network 202 is excited by the state of the DC bridge drive (full bridge) 204 and HF cyclo-converter 206, which flank the LC network 202. A state of the DC bridge drive and HF cyclo-converter are represented by the quantities $V_1$ and $V_2$ respectively, and a resonant current and resonant capacitor voltage quantities are represented by $I_{tank}$ and $V_{tank}$, respectively.

Figure 3:
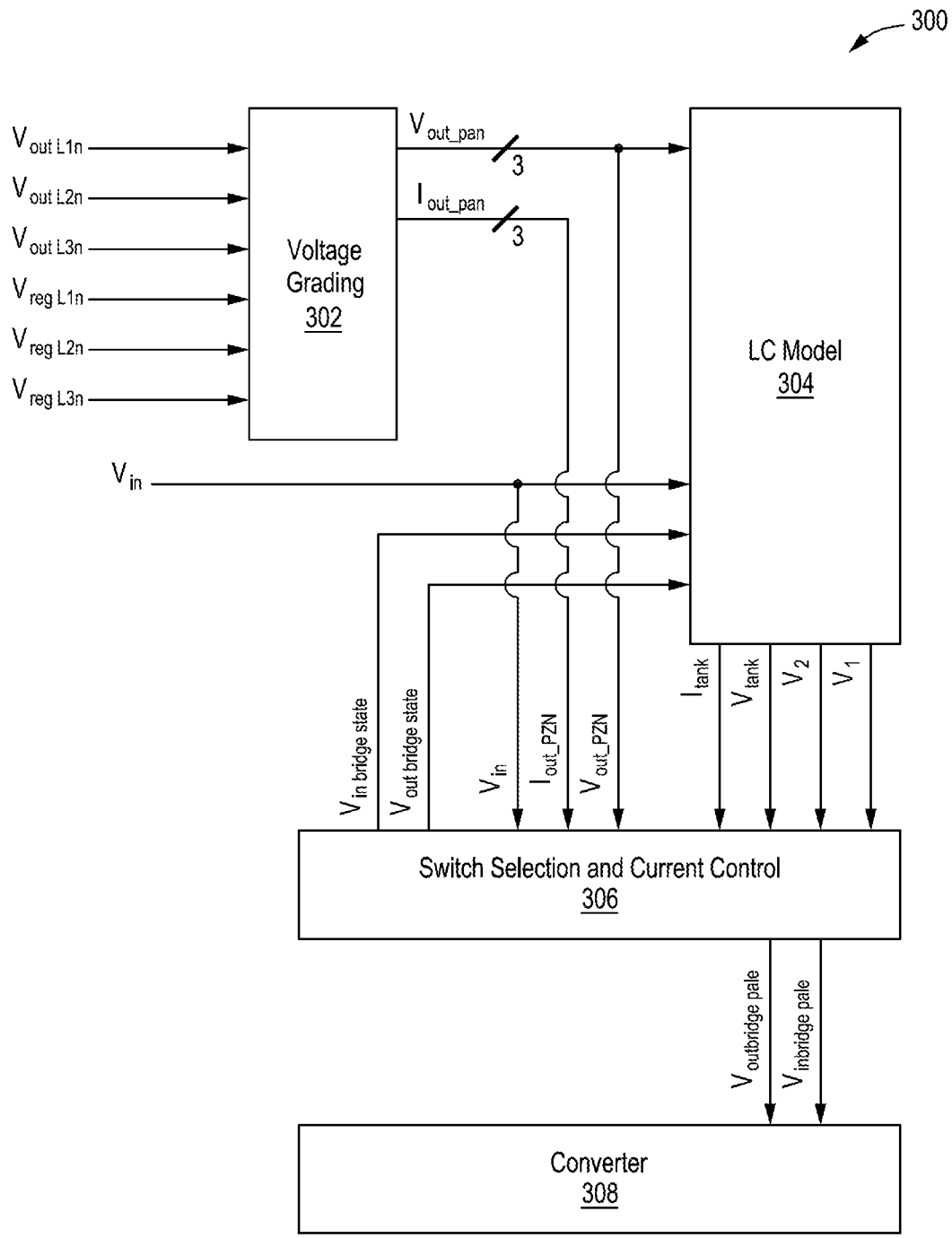
FIG. 3 is diagram of a control system, in accordance with at least some embodiments of the present disclosure.

FIG. 3 is diagram of a control system 300 (e.g., trajectory controller), in accordance with at least some embodiments of the present disclosure. The control system 300 uses a control strategy model to measure, using for example one or more voltage and/or current sensors (not shown), three line voltages $V_{out}$ L1n-L3n, the DC input voltage $V_{in}$ and the tank current $I_{tank}$. The DC input voltage $V_{in}$, each line voltages $V_{out}$ L1n-L3n, which are graded into three voltage bins (e.g., a most negative voltage bin and a most near zero voltage bin) using a voltage grading module 302 and can be denoted as P, Z and N, along with a required/demanded current either into or out of that line voltage, is then used to set/determine an amount of current that is to be transferred through the SRC converter.

An LC model 304 is configured to predict voltage and current values, e.g., the values of $V_1$, $V_2$, $V_{tank}$ and $I_{tank}$. For example, in at least some embodiments, the voltage and current values are predicted using component values of the LC network 202, the transistors Q1-Q4 including corresponding capacitors C1-C4 (e.g., the AC switches), the measured voltages $V_{out\_pzn}$, requested/demanded currents $I_{out\_pzn}$, and $V_{in}$ DC bridge drive state, $V_{out}$ DC bridge drive state and a state of the HF cyclo-converter (e.g., whether the DC bridge drive and HF cyclo-converter are connected to P, Z or N voltages) received from a switch selector and current control module 306. The switch selector and current control module 306 receives the output from the LC model 304 and uses this information to select a correct switch at a correct time to control current being transferred from the input phase through the converter 308 (e.g., the SRC converter) to the output phase.

The LC model 304 is configured to accurately observe the V1 drive voltage so the DC content of that signal can be calculated. When conventional SRC circuits that use a DC blocking capacitor, the resulting DC content of the V1 signal would, typically, be impressed upon the DC blocking capacitor, e.g., as a transformer naturally volt second balances itself. Conversely, as the SRC circuit 100 does not use such a DC blocking capacitor, the DC content of the V1 drive voltage is counteracted by another device and/or action.

Figure 4:
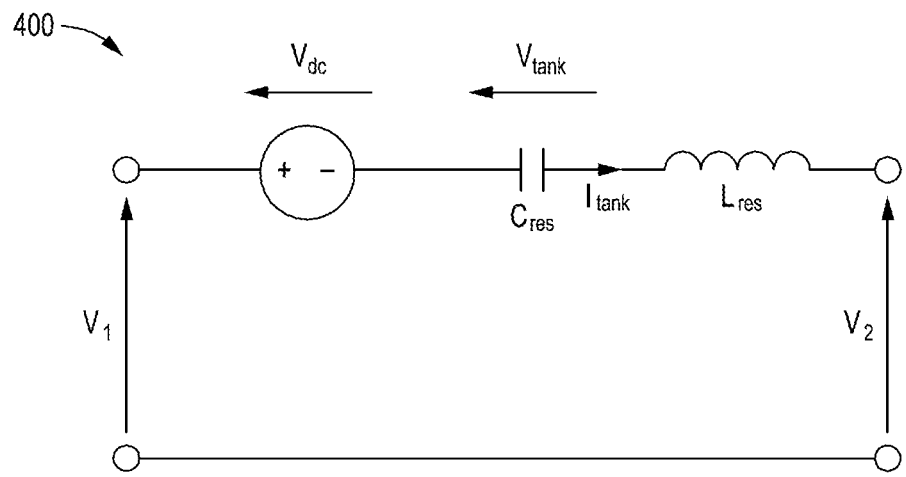
FIG. 4 is a schematic diagram of an SRC equivalent circuit without a transformer, in accordance with at least some embodiments of the present disclosure.

FIG. 4 is a schematic diagram of an SRC equivalent circuit 400 without a transformer, in accordance with at least some embodiments of the present disclosure. More particularly, FIG. 4 illustrates an effect of a DC blocking capacitor acting as a voltage source.

The method of the present disclosure used by the control system 300 calculates a value of current transferred by relating the current to a voltage change on the resonant capacitor ($\Delta V_{tank}$). The relationship used is related to charge delivered through the resonant capacitor and Equations (1) and (2):

$$\text{charge} = I_{req}/f_{resonant}, \quad (1) \text{ and}$$

$$\text{charge} = CV \quad (2)$$

Combining Equations (1) and (2) the change in voltage across the resonant capacitor ($\Delta V_{tank}$) can be observed and is defined by Equation (3):

$$V_{tank} = I_{req}/(f_{resonant} * C_{resonant}), \quad (3)$$

Because the control system 300 directly measures the resonant current ($I_{tank}$), the control system 300 knows the quasi-resonant (forced) frequency (f resonant), resonant),—not to be confused with natural resonance—and the resonant capacitor value ($C_{resonant}$), thus a requested current can easily be translated into $\Delta V$ across the resonant capacitor ($\Delta V_{tank}$) as the control variable for charge transfer and thus current transfer. The control system 300, in a control mode, counteracts the effect of the Vdc (e.g., inherent bias voltage of $V_1$) voltage by controlling the $\Delta V_{tank}$ signal to be biased by −Vdc, thus removing the effect from the circuit and restoring the DC content of the V1 signal to zero.

Figure 5:
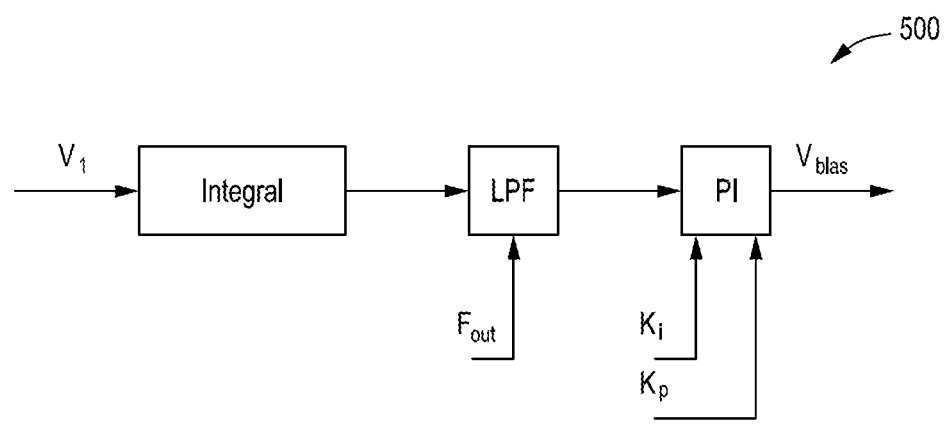
FIG. 5 is a diagram of a V-bias controller, in accordance with at least some embodiments of the present disclosure.
Figure 6:
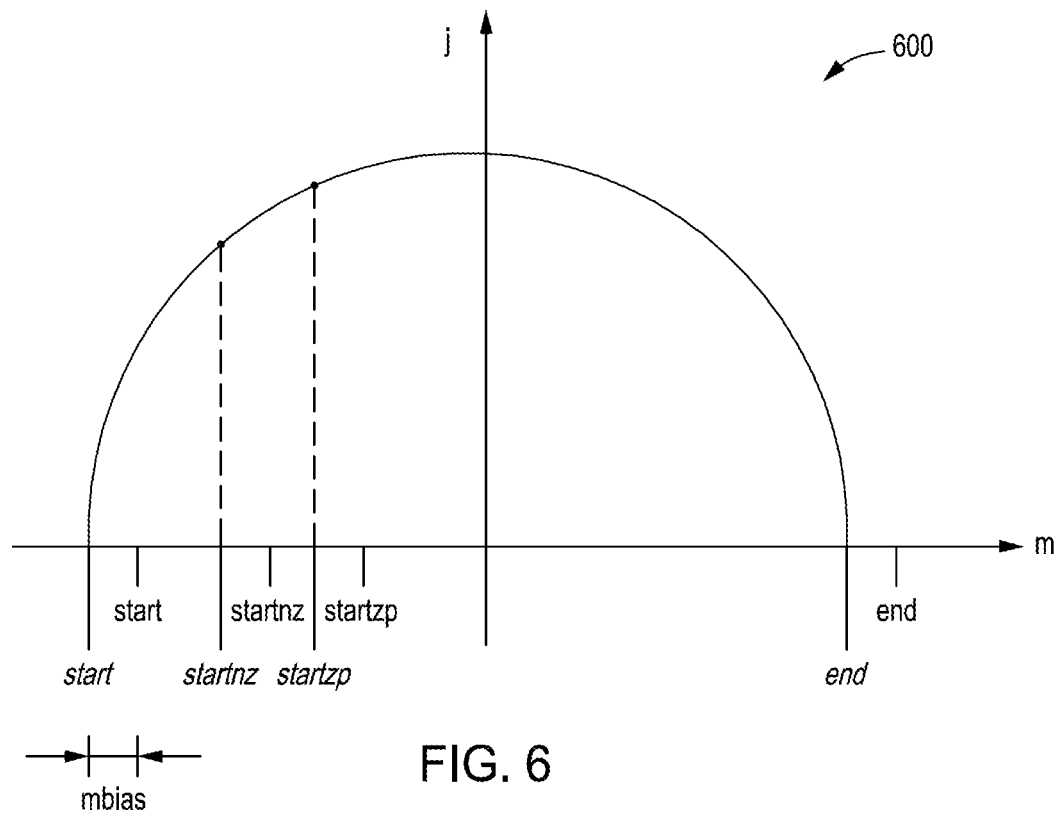
FIG. 6 is a graph of effect of m-bias on charge control, in accordance with at least some embodiments of the present disclosure.

FIG. 5 is a diagram of a V-bias controller 500, and FIG. 6 is a graph 600 of effect of m-bias on charge control, in accordance with at least some embodiments of the present disclosure. Using the control loop shown in FIG. 5, the bias is applied to the controlled $V_{tank}$ as shown in FIG. 6, m is used on the x axis as the scaled quantity for $V_{tank}$.

The top text on the x axis indicates the original start, end and the switching point for the AC bridge moving from N to Z ranked phase voltages (start nz) and from Z to P ranked phase voltages (start zp), the bottom text on the x axis indicates a m bias applied to those controller targets for the AC power converter. By modifying all four targets, an overall charge transfer to an AC port is unaffected by the bias signal, thus maintaining current delivery linearity (e.g., THD on the AC port).

Figure 7:
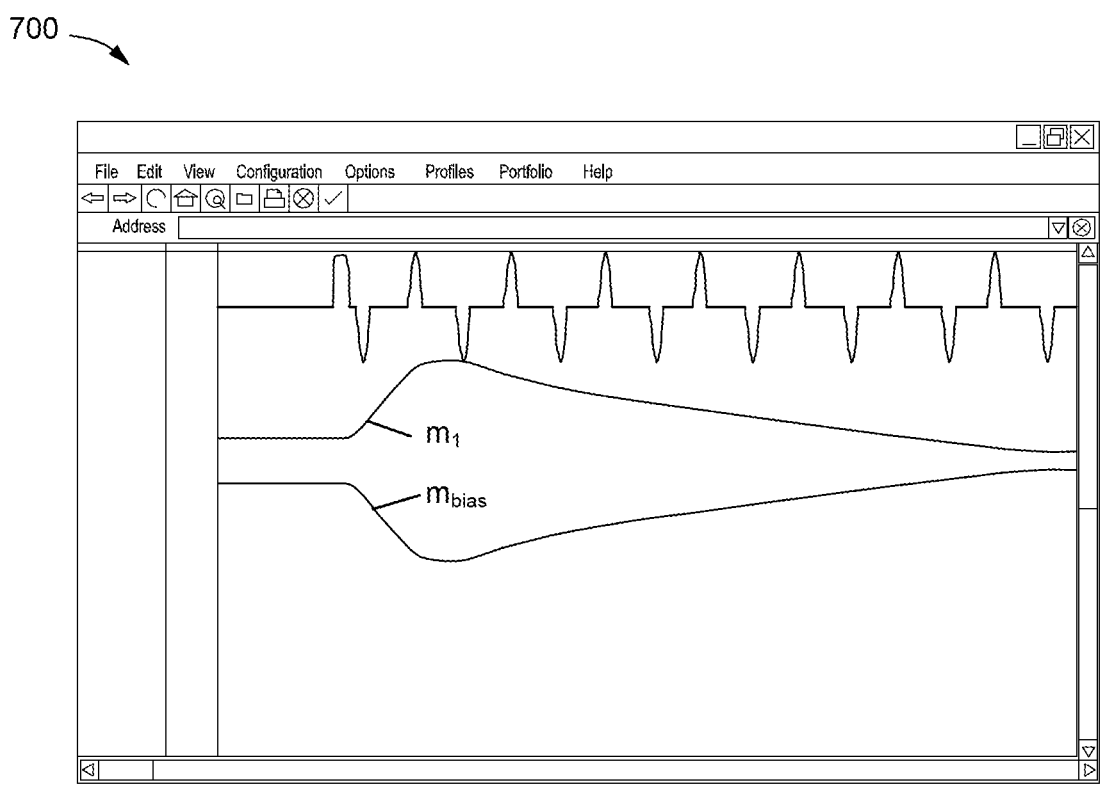
FIG. 7 is a diagram of simulation results of a DC bias signal applied to a controlled $V_{tank}$ signal, in accordance with at least some embodiments of the present disclosure.
Figure 8:
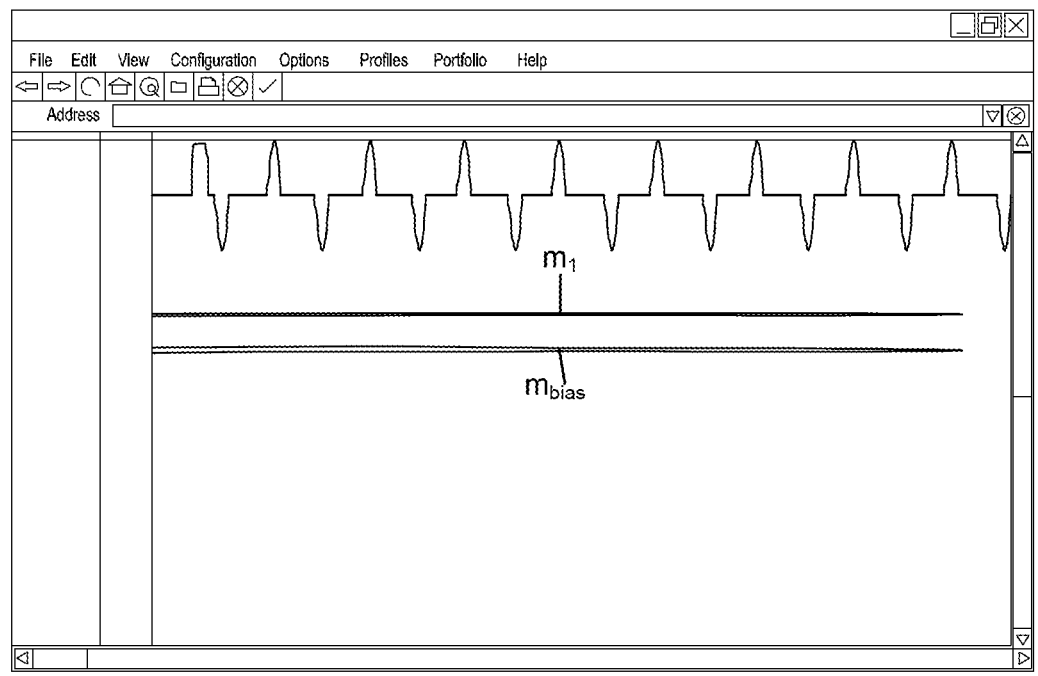
FIG. 8 is a diagram of simulation results without a DC bias signal applied to a controlled $V_{tank}$ signal, in accordance with at least some embodiments of the present disclosure.

FIG. 7 is a diagram 700 of simulation results of a DC bias signal applied to a controlled $V_{tank}$ signal and FIG. 8 is a diagram 800 of simulation results without a DC bias signal applied to a controlled $V_{tank}$ signal, in accordance with at least some embodiments of the present disclosure. A Verilog module was constructed to mimic the behavior of the DC blocking capacitor and apply a bias signal to the controlled $V_{tank}$ signal within the control system 300.

FIG. 7 illustrates the action of measuring the DC content of the $m_1$ signal, which is simply the $V_1$ signal that is scaled to the mutual branch of the SRC circuit where all the control quantities are based. Table 1 below illustrates the m bias control parameters. At the start of the SRC power converter the $m_1$ signal has a clear positive DC content (as the duty cycle is greater than 50%), this is picked up by the output of the $m_1$ average low pass filter (LPF). As the average $m_1$ signal rises positively, the m bias signal rises negatively in order to counter act the DC content of the $m_1$ signal and start to remove the DC content, which can be seen by the reduction of the $m_1$ average LPF signal. After 250 µs, the DC content of the m1 signal has been removed to a sufficiently low number as shown in FIG. 8.

TABLE 1

| Parameter | Value |
| --- | --- |
| Fcut | 3 MHz |
| Kp | −0.2 |
| Ki | −0.003 |

Figure 9:
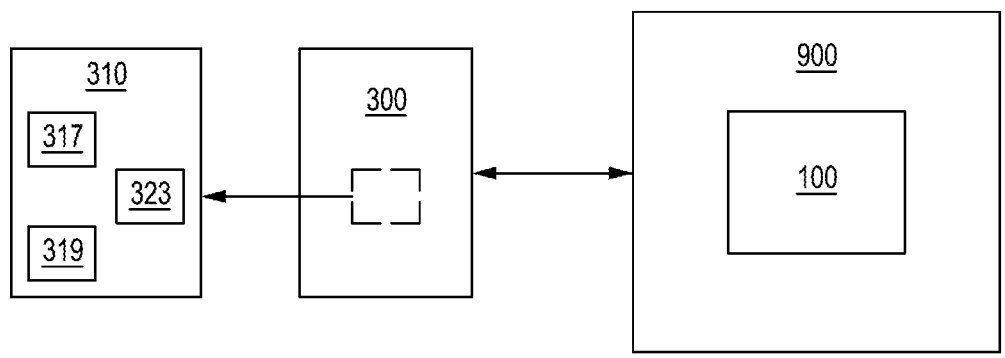
FIG. 9 is a diagram of an SRC converter including the SRC circuit connected to a control system, in accordance with at least some embodiments of the present disclosure.
Figure 10:
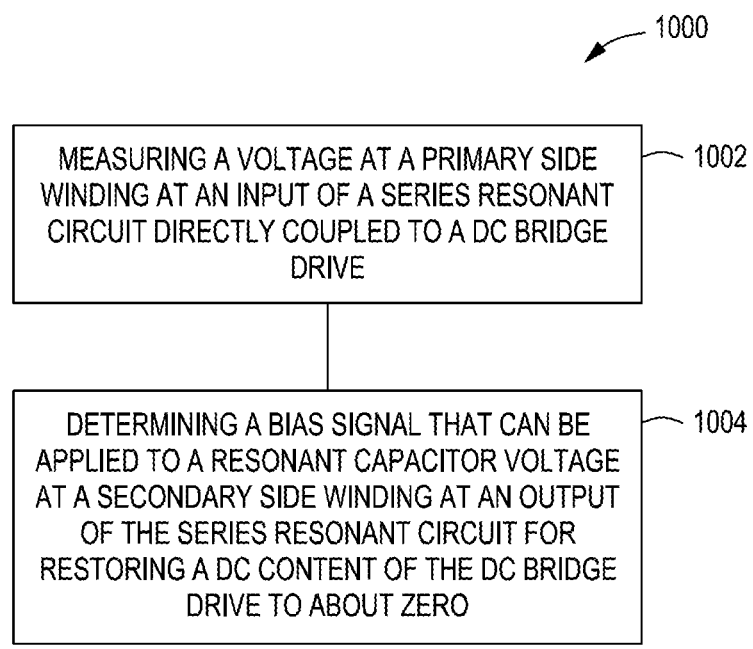
FIG. 10 is a flowchart of a method for controlling a power converter, in accordance with at least some embodiments of the present disclosure.

FIG. 9 is a diagram of an SRC converter 900 including the SRC circuit 100 connected to the control system 300 and FIG. 10 is a flowchart of a method 1000 for controlling a power converter (e.g., the SRC converter 900), in accordance with at least some embodiments of the present disclosure. The control system 300, in addition to the above-described components, can also include, for example, a system controller 310 to control the operation of the control system 300 during operation. Accordingly, the system controller 310 comprises a central processing unit 317, a memory 319 (e.g., non-transitory computer readable storage medium), and support circuits 323 for the central processing unit 317 and facilitates control of the components of the control system 300. The system controller 310 may be one of any form of general-purpose computer processor that can be used in an industrial setting for controlling various power converters. The memory 319 stores software (instructions, source or object code) that may be executed or invoked to control the operation of the control system 300 in the manner described herein.

At 1002, the method 1000 comprises measuring a voltage at a primary side winding at an input of a series resonant circuit directly coupled to a DC bridge drive. During operation (e.g., in three operating modes including buck, boost, and exchange), the control system 300 measure (monitors) a primary winding drive voltage of a power transformer (e.g., the main power transformer 101).

Next, at 1004, the method 1000 comprises determining a bias signal that can be applied to a resonant capacitor voltage at a secondary side winding at an output of the series resonant circuit for restoring a DC content of the DC bridge drive to about zero. For example, as noted above, the control system 300 determines/interprets DC content, and determines an opposing restorative bias that can be applied to an observed resonant capacitor voltage (e.g., m signal) to restore DC content of the DC bridge drive voltage to zero. For steady state inherent trajectory voltage bias, the duty cycle may be maintained at 50%, but as the inherent voltage bias varies over time, a voltage error term can occur (e.g., a non-50% duty cycle) and an integral flux error can accumulate, which can only be corrected by a biased trajectory corresponding to a non-50% duty cycle, that is, the controlled quantity is the flux. For example, with reference again to FIG. 2, in at least some embodiments, the control system 300 directly measures the resonant current ($I_{tank}$), and since the control system 300 is programmed to determine the resonant frequency ($f_{resonant}$) and the resonant capacitor value ($C_{resonant}$), a requested current is translated into V across the resonant capacitor ($V_{tank}$) as the control variable for charge transfer and thus current transfer. The control system 300 counteracts the effect of the Vdc voltage by controlling the $V_{tank}$ signal to be biased by −Vdc, thus removing the effect from the circuit and restoring the DC content of the V1 signal to zero (i.e., without using a DC blocking capacitor).

While the foregoing is directed to embodiments of the present disclosure, other and further embodiments of the disclosure may be devised without departing from the basic scope thereof, and the scope thereof is determined by the claims that follow.

What is claimed is:

1. An apparatus for controlling a power converter, comprising:
   a series resonant circuit including transformer with a primary side winding directly coupled to a DC bridge drive; and
   a control system connected to the series resonant circuit and configured to measure a voltage at the primary side winding for determining a bias signal that can be applied to a resonant capacitor voltage at a secondary side winding of the transformer for restoring a DC content of the DC bridge drive to about zero.

2. The apparatus of claim 1, wherein the primary side winding comprises a first leg including transistors and corresponding capacitors and a second leg including transistors and corresponding capacitors.

3. The apparatus of claim 2, wherein the first leg comprises two transistors connected in series with each other, and wherein the second leg comprises two transistors connected in series with each other, wherein the two transistors of the first leg and the two transistors of the second leg are connected in parallel with each other.

4. The apparatus of claim 3, further comprising a corresponding capacitor and diode that are each connected across each of the two transistors of first leg and each of two transistors of the second leg.

5. The apparatus of claim 1, wherein the control system comprises a voltage grading module that is configured to receive a measure of a plurality of line voltages and grade the plurality of line voltages into a plurality of corresponding voltage bins.

6. The apparatus of claim 5, wherein the plurality of line voltages comprise three line voltages, and the plurality of corresponding voltage bins comprise a most positive voltage bin, a most negative voltage bin and a most near zero voltage bin.

7. The apparatus of claim 1, wherein the control system comprises an LC model that is configured to predict voltage and current values for controlling current being transferred from an input phase to an output phase of the series resonant circuit.

8. A method for controlling a power converter, comprising:
   measuring a voltage at a primary side winding at an input of a series resonant circuit directly coupled to a DC bridge drive; and
   determining a bias signal that can be applied to a resonant capacitor voltage at a secondary side winding at an output of the series resonant circuit for restoring a DC content of the DC bridge drive to about zero.

9. The method of claim 8, wherein the primary side winding comprises a first leg including transistors and a second leg including transistors.

10. The method of claim 9, wherein the first leg comprises two transistors connected in series with each other, wherein the second leg comprises two transistors connected in series with each other, and wherein the two transistors of the first leg and the two transistors of the second leg are connected in parallel with each other.

11. The method of claim 10, further comprising a corresponding capacitor and diode that are each connected across each of the two transistors of first leg and each of two transistors of the second leg.

12. The method of claim 8, further comprising receiving a measurement of a plurality of line voltages and grading the plurality of line voltages into a plurality of corresponding voltage bins based on the measurement.

13. The method of claim 12, wherein the plurality of line voltages comprise three line voltages, and the plurality of corresponding voltage bins comprise a most positive voltage bin, a most negative voltage bin and a most near zero voltage bin.

14. The method of claim 8, further comprising predicting voltage and current values and controlling current being transferred from an input phase to an output phase of the series resonant circuit based on predicted voltage and current values.

15. A non-transitory computer readable storage medium having stored therein instructions that when executed by a processor perform a method for controlling a power converter, comprising:
   measuring a voltage at a primary side winding at an input of a series resonant circuit directly coupled to a DC bridge drive; and
   determining a bias signal that can be applied to a resonant capacitor voltage at a secondary side winding at an output of the series resonant circuit for restoring a DC content of the DC bridge drive to about zero.

16. The non-transitory computer readable storage medium of claim 15, wherein the primary side winding comprises a first leg including transistors and corresponding capacitors and a second leg including transistors and corresponding capacitors.

17. The non-transitory computer readable storage medium of claim 16 wherein the first leg comprises two transistors connected in series with each other, and wherein the second leg comprises two transistors connected in series with each other, wherein the two transistors of the first leg and the two transistors of the second leg are connected in parallel with each other.

18. The non-transitory computer readable storage medium of claim 17, further comprising a corresponding capacitor and diode that are each connected across each of the two transistors of first leg and each of two transistors of the second leg.

19. The non-transitory computer readable storage medium of claim 15, further comprising receiving a measurement of a plurality of line voltages and grading the plurality of line voltages into a plurality of corresponding voltage bins based on the measurement.

20. The non-transitory computer readable storage medium of claim 19, wherein the plurality of line voltages comprise three line voltages, and the plurality of corresponding voltage bins comprise a most positive voltage bin, a most negative voltage bin and a most near zero voltage bin.

* * * * *